United States Patent [19]

Jan et al.

[11] 4,375,452

[45] Mar. 1, 1983

[54] PROCESS FOR THE SEPARATION AND RECOVERY OF MOLYBDENUM AND URANIUM FROM LEACH SOLUTION USING ION EXCHANGE

[75] Inventors: Raymond J. Jan, Englewood; Alistair H. Montgomery, Lakewood, both of Colo.

[73] Assignee: Mobil Oil Corporation, New York, N.Y.

[21] Appl. No.: 311,579

[22] Filed: Oct. 15, 1981

[51] Int. Cl.³ .............................................. C01G 43/00
[52] U.S. Cl. ......................................... 423/7; 423/16; 423/54; 423/15
[58] Field of Search .......................... 423/7, 16, 54, 15

[56] References Cited

U.S. PATENT DOCUMENTS 3,188,169 6/1965 Kraus et al. ............................ 423/7
4,199,470 4/1980 Yasuda et al. ...................... 423/7 X

OTHER PUBLICATIONS

Merritt, Robert C., "The Extractive Metallurgy of Uranium", Colorado School of Mines Research Institute, 1971, pp. 152–164.

Primary Examiner—Deborah L. Kyle
Assistant Examiner—Matthew A. Thexton
Attorney, Agent, or Firm—Charles A. Huggett; James F. Powers, Jr.; Lawrence O. Miller

[57] ABSTRACT

A process is described for recovering uranium from a pregnant lixiviant containing uranium values and a certain portion of molybdenum values comprising passing the pregnant lixiviant through an anion-exchange resin to capture the uranium and molybdenum values on the resin, eluting the uranium and molybdenum values from the resin with a salt solution, passing the eluate through a weak acid cationic resin in its hydrogen form to capture the uranium values on the resin and treating and resulting eluate to precipitate uranium therefrom to produce the familiar "yellow-cake."

6 Claims, 1 Drawing Figure

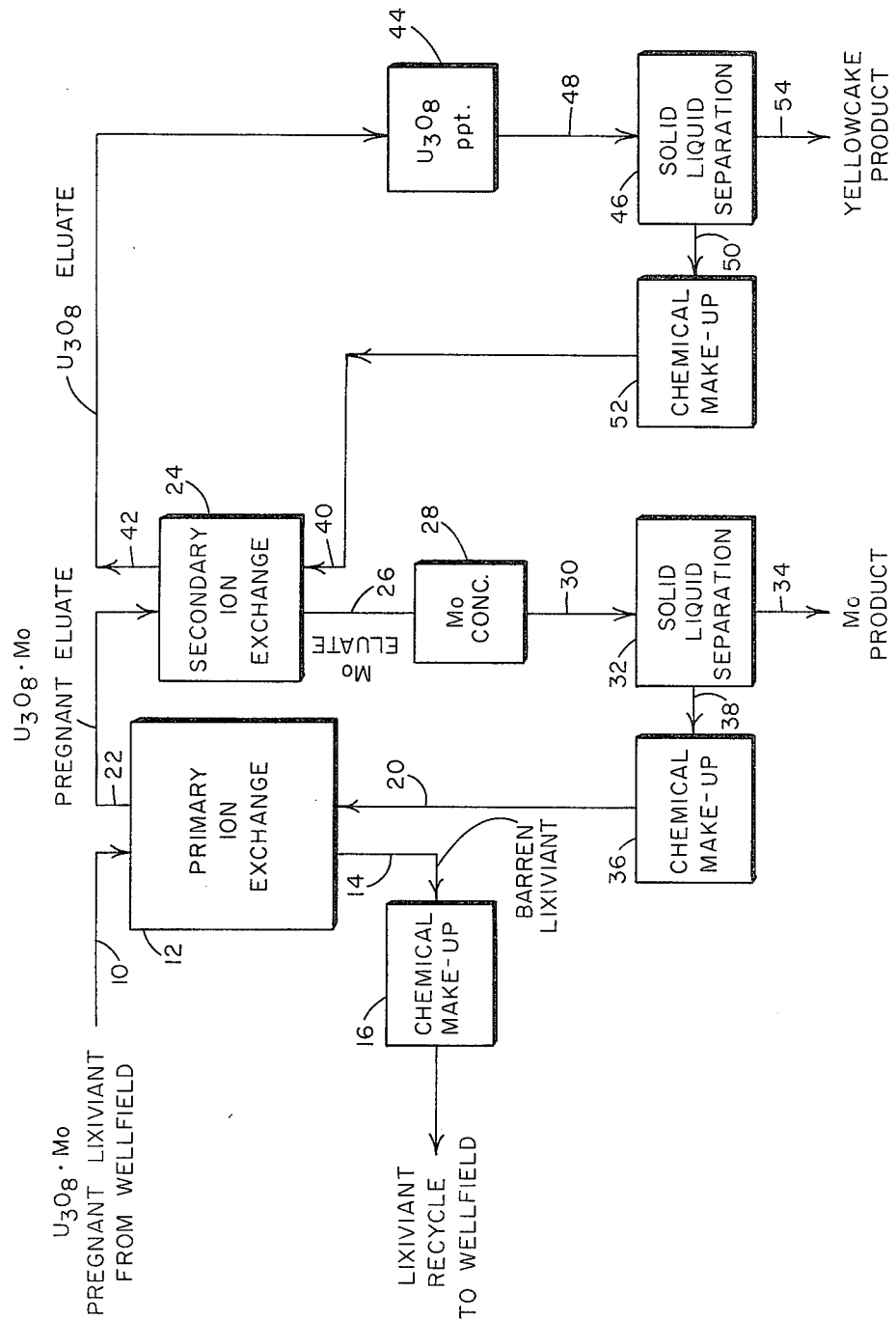

PROCESS FOR THE SEPARATION AND RECOVERY OF MOLYBDENUM AND URANIUM FROM LEACH SOLUTION USING ION EXCHANGE

BACKGROUND OF THE INVENTION

The present invention relates to a process for recovering and separating uranium and molybdenum from a pregnant lixiviant by two-stage ion-exchange adsorption.

Uranium ore deposits which contain certain portions of other metals such as calcium, molybdenum etc. are selectively leached in-situ by passing through a relatively diluted carbonate/bicarbonate solution with oxidants such as oxygen and hydrogen peroxide. The solution withdrawn from the ore deposits will then contain uranium and various contaminants in their different ionic forms co-produced during uranium leaching with molybdenum being the most persistant contaminant. Uranium as well as molybdenum are recovered when the solution is brought into contact with a strong base anion-exchange resin which selectively adsorbs uranium and molybdenum.

Since both uranium and molybdenum are loaded on the anionic resin, and in most cases eluted altogether (although their elution efficiency may be different), a purification step(s) is required before a Mo-free uranium is produced.

Various methods are used for countering the molybdenum problem involving either some method of removing molybdenum from the process liquors or of treating resins in ion exchange methods and solvents in solvent exchange methods to rid them of excess molybdenum.

For example, separation of molybdenum from the uranium eluate can be accomplished by using a tertiary amine solvent at 3–3.5 pH. Molybdenum can also be selectively loaded onto an activated charcoal column thus producing a Mo-free uranium eluant for recovery.

The process of the present invention offers simplicity and economics as compared to the prior art techniques.

SUMMARY OF THE INVENTION

The present invention provides a process for the recovery of uranium from a pregnant lixiviant containing molybdenum as the primary contaminant using a two-stage ion-exchange recovery process. In accordance with the first stage of the present invention, a strong base anionic resin comprising a quaternary amine is employed in a primary column to adsorb uranium and molybdenum values from the pregnant lixiviant. The uranium and molybdenum values loaded on the strong base anionic resin are then eluted from the resin with a suitable eluant such as a salt solution which may contain carbonate/bicarbonate. In the second stage of the process, the pregnant eluate containing uranium and molybdenum values is passed through a secondary column containing a weak acid cationic resin in its hydrogen form wherein the uranium values are adsorbed by the resin. The resin in the secondary column is then treated with an acid eluant to recover the uranium values loaded on the resin. Finally, the pregnant eluate containing uranium values free of molybdenum is then treated to precipitate uranium therefrom to produce the familiar "yellow-cake."

BRIEF DESCRIPTION OF THE DRAWING

The actual operation and the apparent advantages of the invention will be better understood by referring to the drawing in which:

The FIGURE is a schematical view of an in-situ leaching circuit for the recovery of uranium from a pregnant lixiviant containing molybdenum as the most prominent contaminant utilizing a two-stage ion-exchange adsorption process in accordance with the present invention.

DETAILED DESCRIPTION OF THE INVENTION

Uranium containing ore deposits are economically leached by a conventional leaching process wherein uranium values along with other contaminating values wherein molybdenum is the most prominent contaminant are extracted from the ore by means of a leaching fluid or lixiviant. In the case of in-situ leaching, the leaching fluid or lixiviant is introduced into the ore deposit through a predetermined pattern of injection wells. The lixiviant or leaching solution, which may be acidic or alkaline depending on the nature of the ore, will preferentially dissolve uranium values along with a certain portion of contaminating molybdenum values. The resulting uranium-enriched solution (pregnant lixiviant) with the uranium values computed as $U_3O_8$ and also containing molybdenum values is then retrieved through a pattern of production wells for subsequent separation and recovery of the uranium and molybdenum values from the leach solution by means of the present invention involving a two-step ion-exchange resin process.

Referring to the drawing, a description of a preferred embodiment of the method of this invention will be given wherein the pregnant lixiviant contains uranium and molybdenum values. As shown in the drawing, the pregnant $U_3O_8$.Mo lixiviant flows from the withdrawal well (not shown) in the well field via line 10 to a primary column 12 containing a strong base anionic resin comprising a quaternary amine. The resin is made from a styrene divinyl benzene copolymer. To introduce the functional group into the copolymer bead, it is necessary to produce a reactive intermediate. The reactive intermediate is prepared by chloromethylation of the solvent swollen copolymer beads. The intermediate is capable of reacting with a wide variety of amines to produce anion exchange resins of varying chemical functional groups. Resins useful in accordance with the present invention include the materials sold under the trademark Dowex 21K and MSA-1 by Dow Chemical Company and also Rohm & Haas Company's IRA-400. In the ion-exchange column 12, uranium and molybdenum values are loaded on to the ion-exchange resin and the barren lixiviant, now stripped of the desired values, passes from the column via line 14 to a mixing tank 16 where desired amounts of chemicals such as sodium carbonate, carbon dioxide, oxidant, (not shown) are added to the barren lixiviant to brint it back up to strength for recycling in the wellfield leach circuit.

The uranium and molybdenum values are eluted from the ion-exchange resin in column 12 by passing an eluant comprising a salt solution which may contain carbonate/bicarbonate via line 20 through the column. The uranium and molybdenum values are thus extracted from the ion-exchange resin in column 12 to provide a pregnant eluate containing these values that is withdrawn from the column via line 22. The $U_3O_8 \cdot Mo$ eluate is transported via line 22 and introduced into the secondary ion-exchange column 24 containing a weak acid cationic resin in hydrogen form. Because the resin in the secondary column 24 is in hydrogen form, the column is operated at an acidic pH. For the weak acid cationic resin, a suitable major functional group may be selected from the group consisting of carboxylic acid, phenolic, phosphoric, and sulph-hydryl. The $U_3O_8 \cdot Mo$ eluate passes through the ion-exchange resin in column 24 and the uranium values are adsorbed by the resin and the stripped eluate containing molybdenum is withdrawn from the column via line 26. The barren eluate is carried via line 26 to a molybdenum concentrating means 28. The barren solution containing concentrated molybdenum is removed from concentrating means 28 via line 30 and into a separation means 32 where the molybdenum is separated from the liquid barren eluate and withdrawn via line 34. The liquid barren eluate is passed to a mixing tank 36 via line 38 where it is adjusted or fortified with additional chemicals to bring it back up to strength for recycling into column 12 via line 20 to eluate $U_3O_3 \cdot Mo$ therefrom. The size of the secondary ion-exchange resin, column 24 is preferably smaller than that of the primary column 12.

An acid solution eluant such as 4% HCl or $H_2SO_4$ is introduced into column 24 via line 40 to strip the molybdenum-free uranium values from the weak cationic resin. The pregnant eluate containing uranium values is withdrawn from the column 24 via line 42 and pumped to vessel 44 for precipitation of the uranium values preferably by reacting the uranium values with hydrogen peroxide in an acid solution to form a hydrated uranium peroxide product, e.g., $UO_4 \times H_2O$ or by treating the eluate with an acid and then with ammonia to precipitate ammonium diuranate. The resulting precipitate, yellow-cake slurry, is pumped to a storage tank 46 via line 48 for settling and decanting. Once the slurry is settled, the barren solution is conveyed via line 50 to a mixing tank 52 where those chemicals being used to form the eluant used to recover the uranium from column 24 are added to the barren solution to bring it back up to strength for recycling via line 40 to the secondary ion-exchange column 24. The yellow-cake slurry is withdrawn from tank 46 via line 54 and pumped to a vacuum dryer (not shown) where it is dried to yellow-cake powder. The final uranium containing product is free of molybdenum.

The foregoing description of my invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is my invention in the following claims to cover all such equivalent modifications and variations as fall within the true scope and spirit of my invention.

What is claimed is:

1. A process for the recovery of uranium from uranium-containing ore which also contains molybdenum, comprising:

leaching said ore to form uranium and molybdenum values;

passing the leachate through an anion-exchange resin to capture said uranium and said molybdenum values;

eluting said resin with a salt solution containing an anion capable of replacing said uranium and said molybdenum values;

passing the eluate through a weak acid cationic resin in its hydrogen form to capture said uranium values;

eluting said cationic resin with an acid solution capable of replacing said uranium values to recover said uranium values free of molybdenum values; and treating the eluate containing values to precipitate uranium therefrom.

2. A process as defined in claim 1 wherein said anion-exchange resin is eluted with a salt solution containing carbonate/bicarbonate.

3. A process as defined in claim 1 wherein said anion-exchange resin has quaternary amine functional groups.

4. A process as defined in claim 1 wherein said cationic resin is eluted with a solution of 4% HCl.

5. A process as defined in claim 1 wherein said cationic resin is eluted with a solution of 4% $H_2SO_4$.

6. A process as defined in claim 1 wherein a major functional group of said weak acid cationic resin is a member selected from the group consisting of carboxylic acid, phenolic, phosphoric, and sulph-hydryl.

* * * * *

UNITED STATES PATENT AND TRADEMARK OFFICE
CERTIFICATE OF CORRECTION

PATENT NO. : 4,375,452
DATED : March 1, 1983
INVENTOR(S) : Alistair H. Montgomery and Raymond J. Jan It is certified that error appears in the above—identified patent and that said Letters Patent is hereby corrected as shown below:

Column 2, Line 60, change "brint" to read --bring--.

Column 4, Line 13, Change "invention" to read --intention--.

Column 4, Line 34, Insert after "containing" --uranium--.

Signed and Sealed this

Seventeenth Day of July 1984

[SEAL]

Attest:

GERALD J. MOSSINGHOFF

Attesting Officer    Commissioner of Patents and Trademarks